United States Patent
Shibuya

(10) Patent No.: US 6,609,309 B2
(45) Date of Patent: Aug. 26, 2003

(54) DEVICE FOR MEASURING THE LENGTH OF LINEAR MOVEMENT

(75) Inventor: Yukio Shibuya, Omori-nishi (JP)

(73) Assignee: Mineba Co., Ltd., Nagano-ken (JP)

( * ) Notice: Subject to any disclaimer, the term of this patent is extended or adjusted under 35 U.S.C. 154(b) by 0 days.

(21) Appl. No.: 09/940,720

(22) Filed: Aug. 29, 2001

(65) Prior Publication Data

US 2002/0023367 A1 Feb. 28, 2002

(30) Foreign Application Priority Data

Aug. 31, 2000 (JP) ........................................ 2000-263390

(51) Int. Cl.[7] .............................. G01B 3/00; B65H 61/00
(52) U.S. Cl. ........................... 33/733; 33/1 PT; 33/759; 33/760; 33/762; 33/763
(58) Field of Search .......................... 33/733, 759, 760, 33/762, 763

(56) References Cited

U.S. PATENT DOCUMENTS

| | | | | |
|---|---|---|---|---|
| 4,704,798 A | * | 11/1987 | Hird | 33/1 MP |
| 4,896,012 A | * | 1/1990 | Barbulescu | 219/69.12 |
| 4,945,650 A | * | 8/1990 | Hird | 33/763 |
| 5,236,144 A | * | 8/1993 | Kautz | 242/107 |
| 5,761,822 A | * | 6/1998 | Steinich | 33/756 |
| 6,168,107 B1 | * | 1/2001 | Bishop et al. | 242/381 |
| 6,269,547 B1 | * | 8/2001 | Chuang | 33/733 |
| 6,424,768 B1 | * | 7/2002 | Booth et al. | 385/102 |

FOREIGN PATENT DOCUMENTS

GB    2-144-223 A   *   7/1984   ..........   G01D/13/06

* cited by examiner

Primary Examiner—Diego Gutierrez
Assistant Examiner—Amanda J Hoolahan
(74) Attorney, Agent, or Firm—Oliff & Berridge, PLC

(57) ABSTRACT

A device for measuring the length of a linear movement using a rotary potentiometer improves measuring accuracy, measurement deterioration for a long-period usage and miniaturization. The device in includes a regular winding mechanism, forming a single layer of wire, constructed of a screw feeding mechanism stored in a housing to axially move the drum when rotating, and the d m converts a linear displacement into a rotational displacement with the wire. Moreover, the wire on the drum is located so as to have a constant radius from the center of rotation. The screw feeding mechanism is constructed in such a manner that the drum is axially moved by the distance corresponding to one pitch of the regularly wound wire in every revolution of the drum, so that winding and unwinding of the wire can be performed at the same position of the housing all the time, thereby avoiding disarrangement of wound the drum causing a deterioration in an accuracy.

7 Claims, 3 Drawing Sheets

DEVICE FOR MEASURING THE LENGTH OF LINEAR MOVEMENT

BACKGROUND OF THE INVENTION

1. Field of the Invention

The present invention relates to a device for measuring the length of linear movement in which a displacement in the linear direction is converted into a displacement in the rotational direction thereby detecting the displacement in the rotational direction by means of a rotary potentiometer and outputting as electric signals.

2. Description of the Related Art

The measuring device of this type is suitable as a simple displacement detector to detect displacements of a back-and-forth movement of a sheet, a footrest, a backrest, etc. for aircrafts for properly controlling a position or an angle of seats. Besides the aircrafts, it is also useful as a general device for measuring the displacement in the linear movement by detecting the displacement in the electric signal with relatively easy operations.

The measuring device described above may include a means using a wire and a drum for converting the linear displacement into the rotational displacement.

The measuring device of this type is constructed in such a manner that an end of the wire is connected to the drum combined with an input shaft of the rotary potentiometer, and the other end (free end) of the wire is connected to the object to be measured. With this construction, the linear displacement of the object is transferred to the wire so as to rotate the drum and converted into the rotational displacement.

In this arrangement, the rotation of the drum is transmitted to the rotary potentiometer and then electric signals defined by a size according to the rotating angle are taken out from the potentiometer, so that the linear displacement is measured according to the size.

In such a measuring device, a measurement accuracy is not promised unless the displacement of the wire and the rotational angle of the drum achieved by the linear movement of the object to be measured are in a proportional relationship (basically in a direct proportion).

Accordingly, a regular winding mechanism is used for regularly winding the wire in the axial direction of a drum surface by making a single layer when winding the wire in such a manner that both winding of the wire onto the drum surface and unwinding the same from the drum surface are always performed to have a equivalent radius from the center of rotation of the drum.

In conventional measuring devices, the regular winding mechanism is constructed as that a wire guide is moved by the distance of a wire diameter synchronizing with one revolution of the drum while the wire guide is moved parallel in the axial direction of the drum surface.

However, the following problems can be found in the related art.

In order to regularly wind the wire to make a single layer in the axial direction of the drum surface, the wire guide has to be precisely moved in synchronization with the rotation of the drum, so that the construction of the regular winding mechanism became complicated and sizable giving a difficulty to make the construction miniaturized.

For achieving a precise measurement constantly without disarranging the regular winding when winding or unwinding the wire, it is preferable for the wire to be wound or unwound in the direction approximately orthogonal to the axial direction of the drum surface, but this point has not been considered.

Similarly, it is very effective for the constant precise measurement to realize that both winding and unwinding of the wire are always performed at the same position, in other words, the drum is moved in the axial direction without moving the wire for the regular winding. However, this point is also not considered.

In addition to the above, since the wire needs to be kept in a tension all the time for achieving a precise measurement, it becomes unavoidable for the construction to be sizable.

SUMMARY OF THE INVENTION

In the light of the above, it is an object of the present invention to provide a device for measuring the length of the linear movement in which a precise measurement can be constantly secured and the construction thereof can be easily miniaturized.

For the object described above, the first aspect of the present invention comprises: a rotary potentiometer for outputting electric signals according to the rotational angle of an input shaft; a housing fixedly mounted integrally with the potentiometer and formed so as to surround the input shaft of the potentiometer; a drum stored in the housing and having a cylindrical drum surface that rotates coaxially and integrally with the input shaft and being movable in the axial direction of the input shaft; a linear body like a wire the rear end of which is connected to one axial end of the drum and the front end of which is regularly wound toward the other axial end of the drum surface forming a single layer and extends in the direction almost orthogonal to the axis of the drum surface through the housing toward the outside thereof to be connected to the object to be measured; a resilient body like a spiral spring for applying deflection forces on the drum in the direction to wind the linear body on the drum surface; and a screw feeding mechanism setting screw pitches so as to axially move the drum by the distance of circumference-length corresponding to one pitch of the linear body regularly wound in every revolution of the drum.

In the second aspect of the present invention, the resilient body is a spiral spring formed concentrically with the drum.

In the third aspect of the present invention, the portion of the housing where the linear body passes through is mounted with a linear body guide made of fluoroplastic, and the linear body is guided through a linear body insertion hole formed on the guide toward the exterior of the housing.

In the forth aspect of the present invention, the linear body is a stranded wire or like a cable made of stainless steel.

In the first aspect of the present invention, the linear body and the drum convert a linear displacement of the object to be measured into a rotational displacement enabling to measure the linear displacement of the object by the rotary potentiometer.

The screw feeding mechanism moves the drum in the axial direction when rotating the drum. Here, the screw feeding mechanism moves the drum in the axial direction by the distance approximately corresponding to a pitch of the linear body regularly wound in one revolution of the drum so that both winding and unwinding of the linear body are always performed at the same position of the housing.

In this arrangement, the linear body is regularly wound appropriately forming a single layer in the axial direction of the drum surface when being wound, and winding the linear body on the drum surface and unwinding the same from the drum surface are always performed to have an equivalent radius from the center of the rotation of the drum.

Therefore, a proportional relationship can be established among the length of the displacement of the body to be measured, the displacement angle of the drum, and the rotational angle of the input shaft of the rotary potentiometer, thereby increasing a measuring accuracy of the linear displacement of the object by the output signals of the potentiometer.

The resilient body applies back tension forces to the drum in the direction in which the linear body is wound on the drum surface so that an accurate measurement can be secured in a state where the linear body is strained.

In the second aspect of the present invention, the resilient body is constructed of a spiral spring concentrically formed with the drum so that the axial dimension can be reduced compared with other resilient methods.

In the third aspect of the present invention, the linear body is guided exterior of the housing through the linear body insertion hole on the linear body guide made of fluoroplastic. The linear body guide acts to reduce contact friction and abrasion caused by a contact with the linear body when winding and unwinding the linear body.

In the forth aspect of the present invention, the linear body is formed of a stranded wire made of stainless steel. The stainless steel works as a rust prevention, and the stranded wire prevents loosening and extending in the course of time after a long-period employment.

DESCRIPTION OF THE PREFERRED EMBODIMENTS

Embodiments of the present invention will be described with reference to figures.

Figure 1:
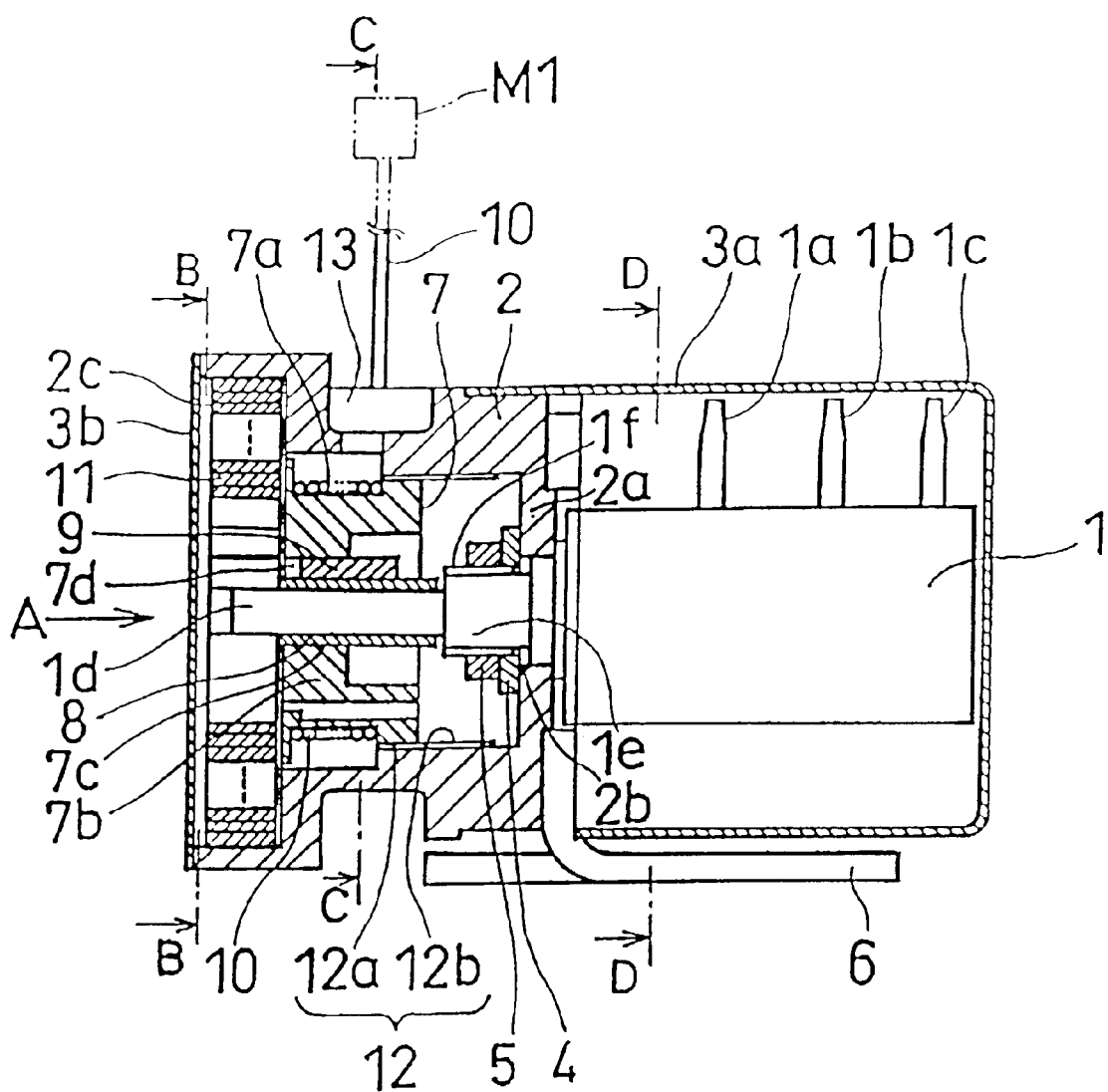
FIG. 1 is a side view partly including cutting portions showing an embodiment of a device for measuring the length of linear movement according to the present invention.
Figure 2:
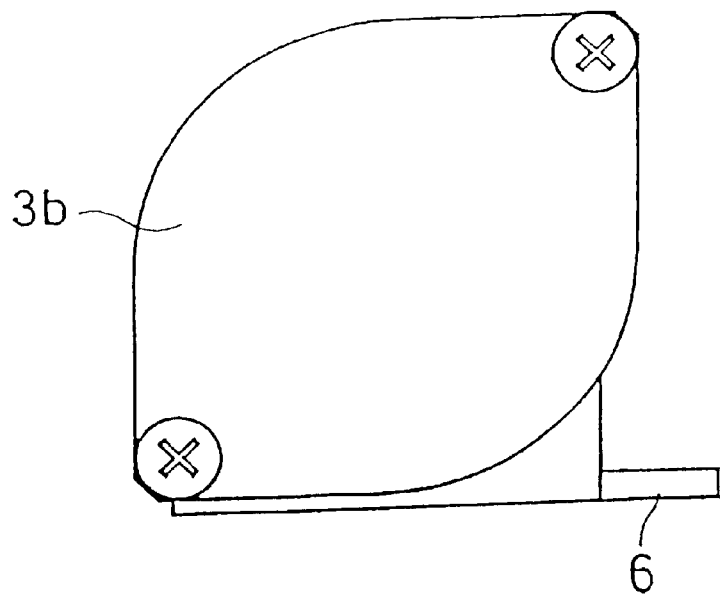
FIG. 2 is the measuring device viewed in the direction indicated by arrow A in FIG. 1.
Figure 3:
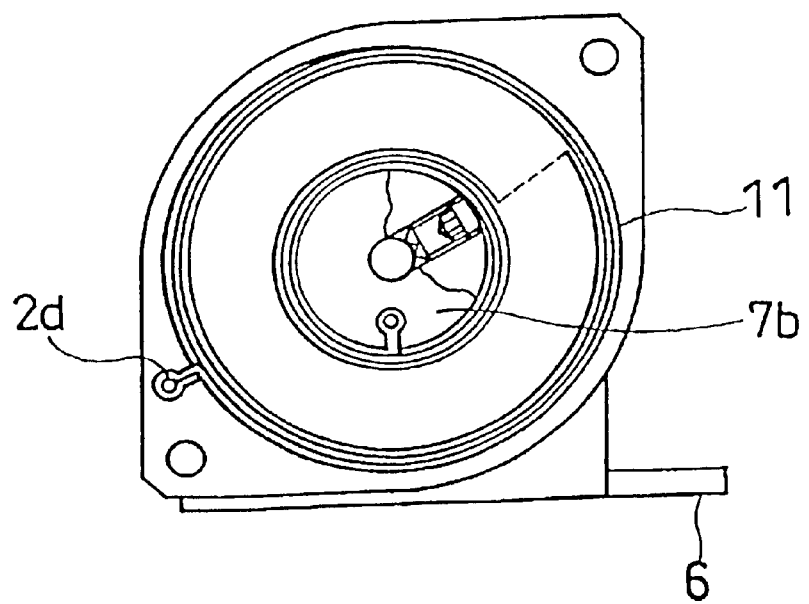
FIG. 3 is a cross section taken along the line B—B in FIG. 1.
Figure 4:
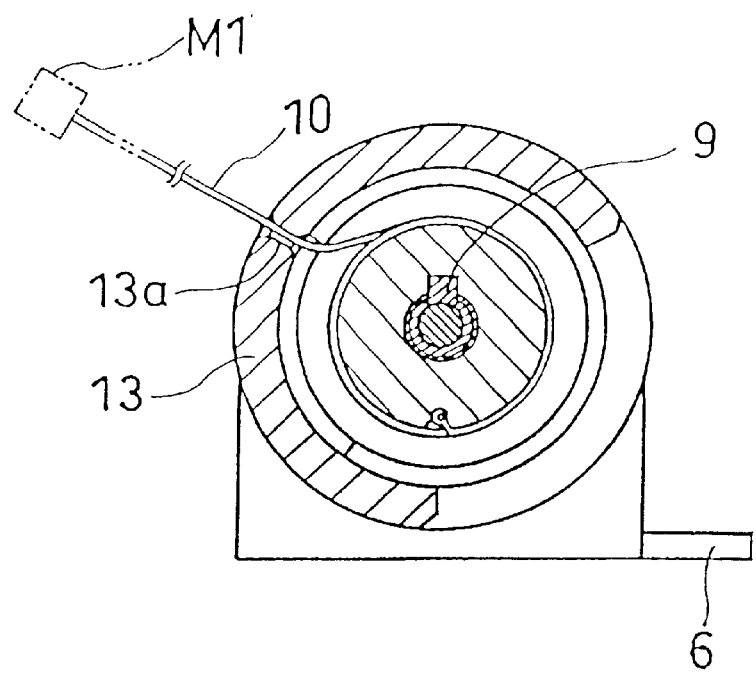
FIG. 4 is a cross section taken along the line C—C in FIG. 1.
Figure 5:
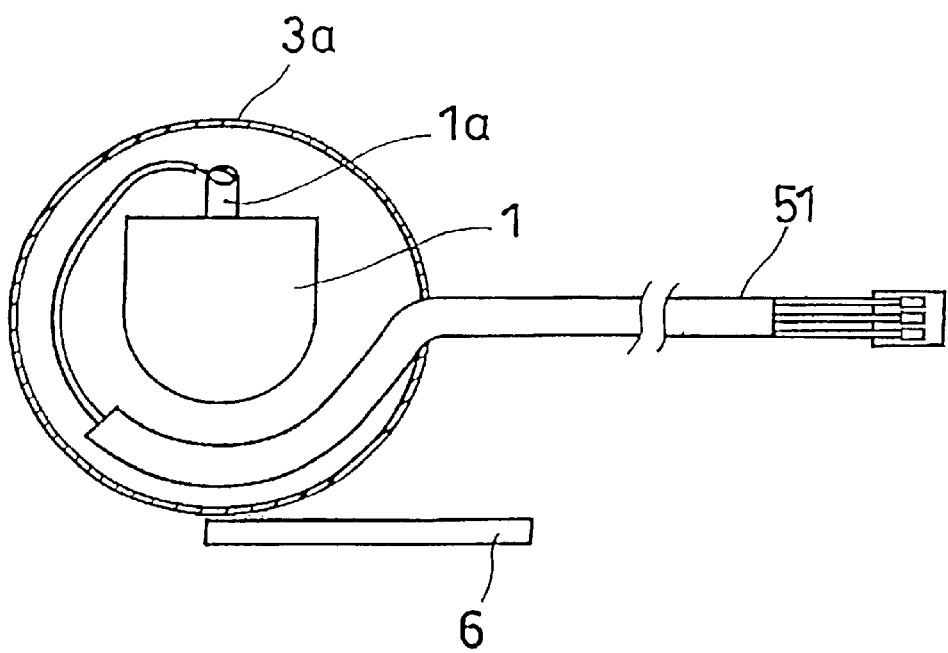
FIG. 5 is a cross section taken along the line D—D in FIG. 1.

FIG. 1 is a side view partly including cutting portions showing an embodiment of the device for measuring the length of the linear movement according to the present invention. FIG. 2 is the measuring device viewed in the direction indicated by the arrow A in FIG. 1. FIG. 3 is a cross sectional view taken along the line B—B in FIG. 1. FIG. 4 is a cross sectional view taken along the line C—C in FIG. 1. FIG. 5 is a cross sectional view taken along the line D—D in FIG. 1. The same reference numerals designate the same or corresponding parts in the drawings.

FIG. 1 shows a drawing partly including cutting portions while FIG. 2 to FIG. 5 show drawings not including the cutting portions. In FIG. 1 to FIG. 4, a lead wire shown in FIG. 5 is omitted. FIG. 4 shows a linear body from the end where winding starts.

The reference numeral 1 in FIG. 1 denotes a rotary potentiometer, which outputs electric signals according to the rotational angle of the input shaft 1d from the terminals 1a to 1c, and from the lead 51 by supplying prescribed potentials to the terminals 1a to 1c through the lead wire 51 shown in FIG. 5.

A housing 2 is fixedly mounted integrally with the potentiometer 1 and formed approximately in cylindrical shape so as to surround the input shaft 1d of the potentiometer 1. The remaining portion of the potentiometer 1 not surrounded by the housing 2 is covered by a cylindrical cover 3a with a bottom.

For integrally mounting the potentiometer 1 and the housing 2, a boss portion 1e on the rear side of the input shaft 1d of the potentiometer 1 is placed in a hole 2b at the center of a wall 2a formed on one side (right side in FIG. 1) of the potentiometer 1 of the housing 2. Then, a washer 4 is fitted on the male screw portion 1f for attaching the potentiometer formed on the outer periphery of the boss potion 1e, and the nut 5 is fixedly engaged thereon. The housing 2 is assembled to an angle 6 by a screw.

The drum 7 is stored in the housing 2 and has a cylindrical drum surface 7a rotating coaxially and integrally with the input shaft 1d of the potentiometer so as to be slidable in axial direction of the input shaft 1d of the potentiometer.

The following construction is made in order to allow the drum 7 to rotate integrally with the input shaft 1d of the potentiometer and to slide in the direction of the axis of the input shaft 1d.

A sleeve-shaped spacer 8 is fixedly fitted on the input shaft 1d of the potentiometer, and the boss portion 7b of the drum 7 is fitted on the input shaft 1d of the potentiometer through the spacer 8, so that the input shaft 1d does not idle with respect to the drum 7.

A key groove 7d is formed on the inner surface of the fitting hole 7c formed on the boss portion 7b of the drum 7 in the axial direction, and the key 9 is slidably fitted in the key groove 7d so as to slide with respect to the inner surface of the key groove 7d after the input shaft 1d of the potentiometer is inserted into the fitting hole 7c.

The material of the drum 7 is preferably a material of brass family considering the smooth sliding with respect to the key 9 and the abrasion resistance, but it may be a synthetic resin material.

The linear body in FIG. 1 and FIG. 4, or the wire 10 in this case, is connected on the rear end (winding-start end) to one axial end of the drum surface 7a of the drum 7, or to the left end in FIG. 1. The tip side (free end) of the wire 10 is regularly wound to form a single layer with the drum surface 7a faced to the axial other end, or the right end in FIG. 1, so as extend from the axial right end of the drum surface 7a to the direction almost orthogonal to the axis of the drum surface 7a, or upward in FIG. 1. Then it is guided through the housing toward the exterior of the housing 2 to be connected to the object to be measured M1.

In this way, the tip of the wire 10 extends in the direction almost orthogonal to the axis of the drum surface to be connected to the object to be measured M1, and preferably, the wire 10 is connected to the object to be measured M1 at the position on the extension in the extended direction for smooth unwinding and winding of the wire 10 and measurement with less error.

A stainless steel stranded wire is one of the preferable options for the wire 10 because of less expansion and lower occurrence of rust after long-period employment.

The resilient body in FIG. 1 and FIG. 3, or a spiral spring 11 here, provides deflection forces to the drum 7 in the direction in which the wire 10 is wound on the drum surface 7a, whereby the wire 10 is always strained being possible for a correct measurement.

The spiral spring 11 made of a steel in this embodiment is formed in concentrically with the drum 7 as shown in FIG. 3 and fitted on the housing 2 between the inner periphery of the opening 2c on the opposite side from the potentiometer 1 (on the left side in FIG. 1) and the outer periphery of the tip portion of the input shaft 1d of the potentiometer.

The spiral spring 11 is constituted as that a winding-start end is connected to the end surface of the boss portion 7b of the drum 7, and a winding-finish end is connected to a recessed portion 2d (See FIG. 3) formed on an inner peripheral wall of the opening 2c of the housing 2. Therefore, when the wire 10 is unwound outwardly from the drum surface 7a, deflection forces act in the direction in which the wire 10 is wound on the drum surface 7a.

Even in a state where the wire 10 is not at all unwound from the drum surface 7a, the deflection forces like a back-tension can be set to be generated thereby ensuring the keeping of the regularly wound condition of the wire 10 when the measuring device is in a suspending mode.

The opening 2c of the housing 2 is covered by a plate cover 3b so as to prevent deformation or damage of the spiral spring 11.

Between the outer periphery of the drum 7 and the inner periphery of the housing 2, there is provided a screw feeding mechanism 12 for moving the drum 7 in the axial direction when the drum 7 is rotated.

The screw feeding mechanism 12 is set in such a manner that winding and unwinding of the wire 10 is performed at the same position (identical position on the housing 2 along the axis of the input shaft 1d of the potentiometer) on the housing 2 all the time. That is, in the screw feeding mechanism 12, the feed screw pitch is set as that the drum 7 moves in the axial direction by the distance corresponding to one pitch of the wire 10 regularly wound in the axial direction of the drum surface 7a in one revolution of the drum 7.

The screw feeding mechanism 12 is constructed in a screw engaging structure in which a male screw portion 12a disposed on the outer periphery of the drum 7 adjacent to the drum surface 7a and having a larger diameter than the drum surface 7a, and a female screw portion 12b formed on the inner periphery of the housing 2 corresponding to the rear end portion of the input shaft 1d of the potentiometer.

Here, the pitch of the screw of the male screw portion 12a is set to be almost the same as one pitch of the wire 10 regularly wound in the direction of drum surface so as to attain the movement of the drum 7 in the axial direction by the distance corresponding to one pitch of the wire 10 regularly wound in one revolution.

In this embodiment, a wire guide 13 is mounted to the portion of the housing 2 where the wire passes through, and the wire 10 is guided exterior of the housing 2 through a wire insertion hole 13a formed on the wire guide 13.

The wire guide 13 is preferably made of a fluoroplastic characterizing in a low friction/low abrasion, such as Teflon (registered trademark). When the wire guide 13 is made of the fluoroplastic, the durability of both the wire 10 and the wire guide 13 can be improved, and also a generation of friction heat from the wire 10 and the wire guide 13 can be prevented when winding and unwinding the wire 10.

The operation of the device is hereinafter described.

The tip of the wire 10 is assumed to be connected to the object to be measured M1 (hereinafter referred to as M1) in advance.

When M1 moves linearly upward or downward in FIG. 1 from this position and the wire 10 moves along the length thereof, winding of the wire 10 on the drum surface 7a and unwinding of the wire from the drum surface 7a are performed.

FIG. 1 exemplifies a measurement in which the wire 10 is regularly wound along the entire surface in the axial direction of the drum surface making a single layer and M1 is linearly moved from a lower limit to an upper side in the figure. Here, unwinding of the wire 10 from the drum surface 7a can be performed.

In this case, the spiral spring 11 applies deflection forces like a back tension force to the drum 7 in the direction in which the wire 10 is wound on the drum surface 7a being possible for the wire 10 to be always strained (to be kept always tensioned).

Therefore, the drum 7 rotates by the extent corresponding to the length of movement in association with the linear movement of M1 (longitudinal movement of the wire 10), and the input shaft 1d of the potentiometer 1 rotates as well.

Therefore, the potentiometer 1 outputs electric signals corresponding to the rotational angle of the input shaft 1d from terminals 1a–1c, more specifically, from the prescribed two terminals among the terminals 1a–1c as a potential thereby measuring the length of the linear movement of M1.

The relation between the length of the movement of the wire 10 and the rotational angle (rotational angle of the input shaft 1d of the potentiometer) Θ of the drum surface 7a (drum 7) is as follows (1).

$$\Theta = 2L/(D+d) \qquad \text{(rad)} \ldots (1)$$

Where D is a diameter of the drum surface 7a (drum 7) and d is a diameter of the wire 10.

In order to increase accuracy of measurement, it is important to increase the value of (D+d) in the above formula (1), in other words, to increase the winding accuracy of the wire 10 (accuracy in which the wire 10 is regularly wound in the axial direction of the drum surface forming a single layer).

Therefore, a regular winding mechanism provided with a wire guide in the related art is replaced by a screw feeding mechanism 12 in the present invention.

The screw feeding mechanism 12 is a feeding mechanism in which the pitch of the feeding screw is designed in such a manner that the drum 7 moves in the axial direction by the distance corresponding to approximately one pitch of the regularly wound wire 10 wound in one revolution of the drum 7.

In this screw feeding mechanism 12, winding and unwinding of the wire 10 are always performed at the same position (at the guide position) so that the regular winding can be carried out by axially moving the drum 7 without axially moving the wire 10. Therefore, winding or unwinding of the wire 10 in the direction almost orthogonal to the axis of the drum surface can be possibly performed for a constant accurate measurement without disarranging the regular winding.

The screw feeding mechanism 12 is a miniaturized and a simplified mechanism, which comprises a male screw portion 12a formed on the outer peripheral surface of the drum 7 and a female screw portion 12b formed on the inner peripheral surface of the housing 2, thereby facilitating a miniaturization of the entire construction of the measuring device.

In order to strain the wire 10 all the time for an accurate measurement, the spiral spring 11 formed concentrically with the drum 7 is used in this embodiment. For this reason, the axial dimension can be significantly reduced, and the measuring device can be miniaturized in such a manner as to define the radial dimension shorter than the one of the potentiometer 1.

The device for measuring the linear displacement according to the present invention is miniaturized by constructing as that a stranded wire made of a stainless steel of 0.5 Φ is used for the wire 10 and an input voltage of DC 5V is used for a rotary potentiometer 1.

In the present invention as described above, the drum is moved in the axial direction when the drum in the housing is rotated, and a screw feeding mechanism for moving the drum in the axial direction by the distance corresponding to approximately one pitch of the regularly wound linear body in every revolution is employed as a wire regular-winding mechanism so that winding and unwinding of the linear body is always performed at the same position of the housing surrounding the input shaft of the potentiometer.

Accordingly, the linear body is regularly wound in the direction of the drum surface forming a single layer when winding the linear body, so that winding the linear body on the drum surface and unwinding the same from the drum surface are always performed to have a constant radius from the center of rotation of the drum.

Therefore, an accurate proportional relationship can be established among a length of displacement of an object to be measured, an angle of displacement of the drum, and a rotational angle of the input shaft of the potentiometer, whereby the measurement of linear displacement of the object to be measured (length of the linear movement) by output signals from the potentiometer may be constantly performed with accuracy.

The screw feeding mechanism is constructed by the engagement of the male screw portion on the outer peripheral surface of the drum and the female screw portion on the inner peripheral surface of the housing, whereby the miniaturization of the mechanism for regularly winding the wire and thus the entire measuring device can be easily attained.

What is claimed is:

1. A device for measuring the length of the linear movement comprising:
    a rotary potentiometer for supplying electric signals according to an angle of rotation of an input shaft;
    a housing fixedly mounted integrally with said potentiometer and formed so as to surround said input shaft of said potentiometer;
    a drum stored in a housing and having a cylindrical drum surface that rotates coaxially and integrally with said input shaft and being movable in an axial direction of said input shaft;
    a linear body the rear end of which is connected to one axial end of said drum and the front end of which is regularly wound toward the other axial end of said drum surface to form a single layer and extends in the direction almost orthogonal to the axis of said drum surface through the housing toward the outside thereof to be connected to the object to be measured;
    a resilient body for applying deflection forces on said drum in the direction to wind said linear body on the drum surface; and
    a screw feeding mechanism with screw pitches so that said drum moves in an axial direction by the distance corresponding to approximately one pitch of said linear body regularly and continously wound in every revolution of said drum.

2. The device for measuring the length of the linear movement according to claim 1, characterized in that said resilient body is a spiral spring formed concentrically with said drum.

3. The device for measuring the length of the linear movement according to claim 2, characterized in that the portion of the housing where said linear body passes through is mounted with a linear body guide made of fluoroplastic, and said linear body is guided exterior of the housing through an linear body insertion hole formed on the guide.

4. The device for measuring the length of the linear movement according to claim 2, characterized in that said linear body is a stranded wire made of stainless steel.

5. The device for measuring the length of the linear movement according to claim 1, characterized in that the portion of the housing where said linear body passes through is mounted with a linear body guide made of fluoroplastic, and said linear body is guided exterior of the housing through an linear body insertion hole formed on the guide.

6. The device for measuring the length of the linear movement according to claim 5, characterized in that said linear body is a stranded wire made of stainless steel.

7. The device for measuring the length of the linear movement according to claim 1, characterized in that said linear body is a stranded wire made of stainless steel.

* * * * *